(12) United States Patent
Scott et al.

(10) Patent No.: US 11,770,189 B2
(45) Date of Patent: Sep. 26, 2023

(54) OPTICAL COMMUNICATION SYSTEM USING A PHOTONIC LANTERN

(71) Applicant: COM DEV Ltd., Mississauga (CA)

(72) Inventors: Alan Scott, Arnprior (CA); Hugh Podmore, Toronto (CA)

(73) Assignee: Honeywell Limited Honeywell Limitée, Mississauga (CA)

( * ) Notice: Subject to any disclaimer, the term of this patent is extended or adjusted under 35 U.S.C. 154(b) by 0 days.

(21) Appl. No.: 17/478,627

(22) Filed: Sep. 17, 2021

(65) Prior Publication Data

US 2023/0093006 A1    Mar. 23, 2023

(51) Int. Cl.
*H04J 14/02*    (2006.01)
*H04B 10/25*    (2013.01)
(Continued)

(52) U.S. Cl.
CPC ........... *H04B 10/25* (2013.01); *H04B 10/294* (2013.01); *H04B 10/506* (2013.01); *H04J 14/02* (2013.01)

(58) Field of Classification Search
CPC .... H04B 10/25; H04B 10/294; H04B 10/506; H04B 10/2581; H04B 10/50; H04B 10/503; H04B 10/40; H04J 14/02; H04J 14/04; H04J 14/0205; H04J 14/06; G02B 6/0288; G02B 6/14
(Continued)

(56) References Cited

U.S. PATENT DOCUMENTS 9,322,992 B2    4/2016    Woodward et al.
9,692,515 B2    6/2017    Chen et al.
(Continued)

FOREIGN PATENT DOCUMENTS

CN    106895959 B    1/2019
CN    110098868 A    8/2019
(Continued)

OTHER PUBLICATIONS

Birks et al., "The Photonic Lantern", Adv. Opt. Photon., 2015, 7: 107-167.
(Continued)

*Primary Examiner* — Hibret A Woldekidan
(74) *Attorney, Agent, or Firm* — BERESKIN & PARR LLP/S.E.N.C.R., s.r.l.

(57) ABSTRACT

Various embodiments are disclosed herein with generally relate to an optical communication system using a photonic lantern. In at least one embodiment, the optical system comprises: an optical transmitter coupled to a signal transmitting path; an optical receiver coupled to a signal receiving path; a photonic lantern, the photonic lantern extending between a first open end and a second open end, the first end comprising an opening to a single multi-mode fiber, and the second end comprising a plurality of single mode fibers that are adiabatically coupled to the multi-mode fiber, the plurality of single-mode fibers includes a single-mode fiber adapted to carry a fundamental optical mode and the remaining single-mode fibers adapted to carry higher-order optical modes, wherein, the single-mode fiber is coupled to the optical transmitting path, the remaining single-mode fibers are coupled to the optical receiving path.

19 Claims, 11 Drawing Sheets

(51) Int. Cl.
*H04B 10/294* (2013.01)
*H04B 10/50* (2013.01)

(58) Field of Classification Search
USPC .... 398/44, 72, 141, 142, 143, 144, 135, 139
See application file for complete search history.

(56) References Cited

U.S. PATENT DOCUMENTS

| | | | |
|---|---|---|---|
| 9,810,862 | B2 | 11/2017 | Graves et al. |
| 10,122,447 | B2 | 11/2018 | Takahashi et al. |
| 10,411,802 | B2 | 9/2019 | Tanaka et al. |
| 10,715,251 | B2 | 7/2020 | Li |
| 10,768,370 | B1 | 9/2020 | Esman |
| 10,892,824 | B2 | 1/2021 | Geisler et al. |
| 10,996,399 | B2 | 5/2021 | Yang et al. |
| 2014/0186040 | A1 | 7/2014 | Fujiwara et al. |
| 2015/0098697 | A1 | 4/2015 | Marom et al. |
| 2017/0336248 | A1 | 11/2017 | Galtarossa et al. |
| 2018/0259825 | A1* | 9/2018 | DeSalvo ............ H04B 10/2587 |
| 2020/0083659 | A1* | 3/2020 | Reeves-Hall ......... H01S 3/1301 |
| 2020/0186248 | A1 | 6/2020 | Chamberlain et al. |
| 2020/0333441 | A1 | 10/2020 | Diaz |
| 2020/0343973 | A1 | 10/2020 | Geisler et al. |
| 2021/0018737 | A1* | 1/2021 | Salla ...................... F21V 5/043 |
| 2021/0278706 | A1 | 9/2021 | Montoya et al. |
| 2021/0351844 | A1 | 11/2021 | Iranzad |

FOREIGN PATENT DOCUMENTS

| | | |
|---|---|---|
| CN | 113281845 A | 8/2021 |
| GB | 2534917 A | 8/2016 |
| WO | 2010/090364 A1 | 8/2010 |
| WO | 2021/154082 A1 | 8/2021 |

OTHER PUBLICATIONS

Belmonte et al., "Field Conjugation Adaptive Arrays in Free-Space Coherent Laser Communications", IEEE/OSA Journal of Optical Communications and Networking, 2011, 3(11): 830-838.
Cai et al., "Free-space optical relaying system with few-mode all-optical relay", Optics Communications, 2019, 439: 164-170.
Liu, "Mode Coupling in Space-division Multiplexed Systems", 2019, University of Central Florida, STARS, Electronic Theses and Dissertations, 6754, pp. 1-82.
Zhang et al., "All-fiber photonic lantern multimode optical receiver with coherent adaptive optics beam combining", arXiv:2105.09516. May 2021, pp. 1-7.
Tedder et al., "Single-Mode Fiber and Few-Mode Fiber Photonic Lanterns performance evaluated for use in a Scalable Real-time Photon Counting Ground Receiver", Proc. SPIE, 2019, 10910: 109100G (10 pages).
Diab et al., "Starlight coupling through atmospheric turbulence into few-mode fibers and photonic lanterns in the presence of partial adaptive optics correction", arXiv:2011.134232020, 2020, pp. 1-12.
Oran et al., "Performance Evaluations of Single Mode Optical Receiver for Degraded Visual Field and Photonic antern Based Coherent Detection", Master Thesis, Abdullah Gül University, 2016, pp. 1-73.
Saval et al., "Photonic lanterns: a study of light propagation in multimode to single-mode converters", Optics Express, 2010, 18(8): 8430-8439.
Ahrens et al., "Optical MIMO Multi-mode Fiber Transmission using Photonic Lanterns", In Proceedings of the 14th International Joint Conference on e-Business and Telecommunications (ICETE 2017), vol. 3: OPTICS, pp. 24-31.
Billault et al., "Free space optical communication receiver based on a spatial demultiplexer and a photonic Integrated coherent combining circuit", Optics Express, Sep. 29, 2021 (Oct. 2021), 29(21): 33134-33143.
Liu et al., "3x10 GB/s mode group-multiplexed transmission over a 20 km few-mode fiber using photonic lanterns", Optical Fiber Communication Conference 2017, Los Angeles, CA, Mar. 19-23, 2017 (3 pages).
Sampson et al., "Turbulence-resistant free-space communication using few-mode preamplifiers", Proc. SPIE, 2019, 10947: 1094707-1 to -7.
Velázquez-Benítez et al., "Scaling photonic lanterns for space-division multiplexing", Scientific Reports, 2018, 8:8897, pp. 1-9.
Cruz-Delgado et al., "Control over the transverse structure and long-distance fiber propagation of light at the single-photon level", Scientific Reports, 2019, 9: 9015, pp. 1-9.
Cruz-Delgado et al., "Photonic lantern tip/tilt detector for adaptive optics systems", Opt. Lett., Jul. 2021, 46(13): 3292-3295.
Norris et al., "An all-photonic focal-plane wavefront sensor", Nat. Commun., 2020, 11: 5335 (2020).
Fontaine et al., "Geometric requirements for photonic laterns in space division multiplexing", Nov. 19, 2012 / vol. 20, No. 24 Optics Express (10 pages).

\* cited by examiner

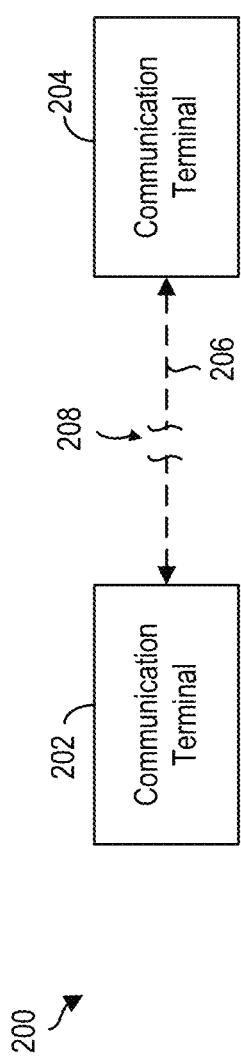
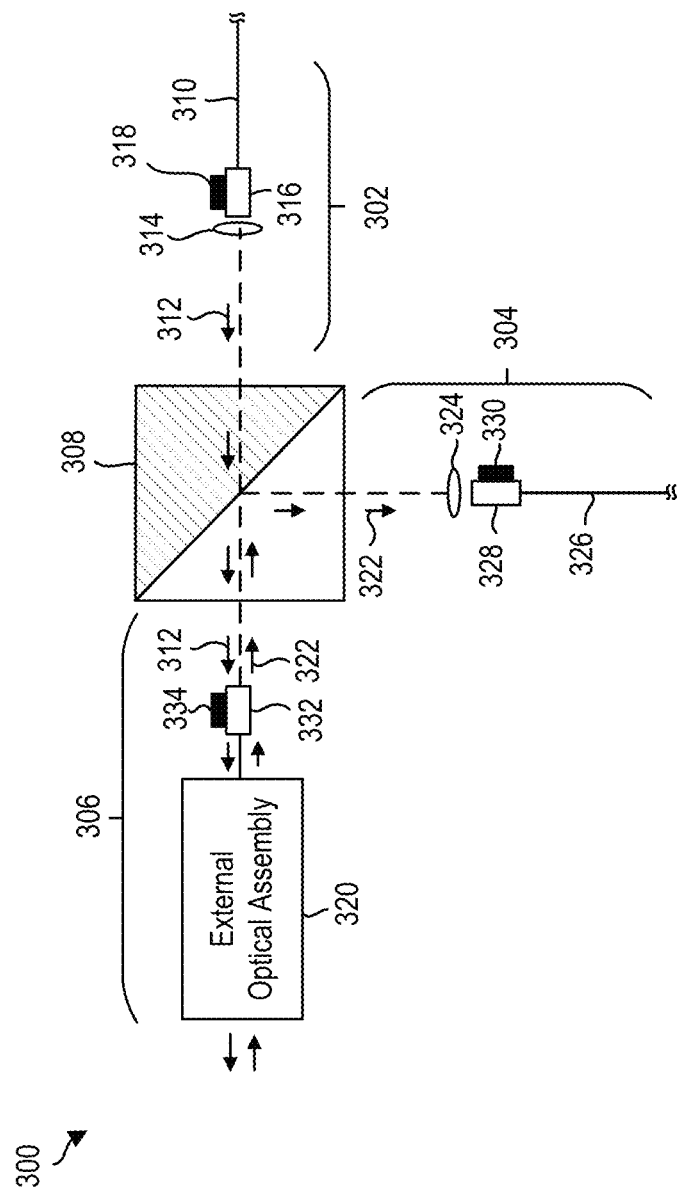

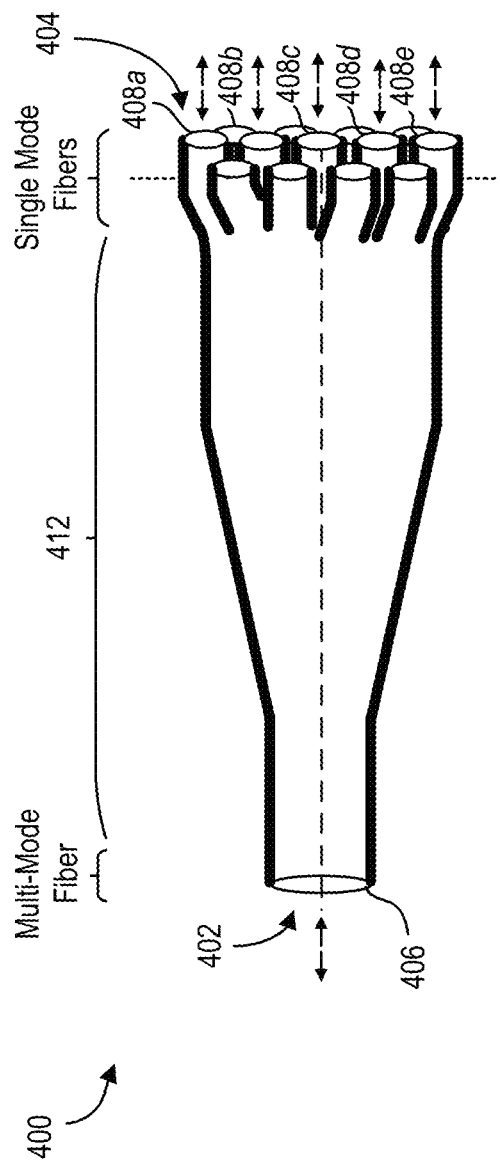
FIG. 4A
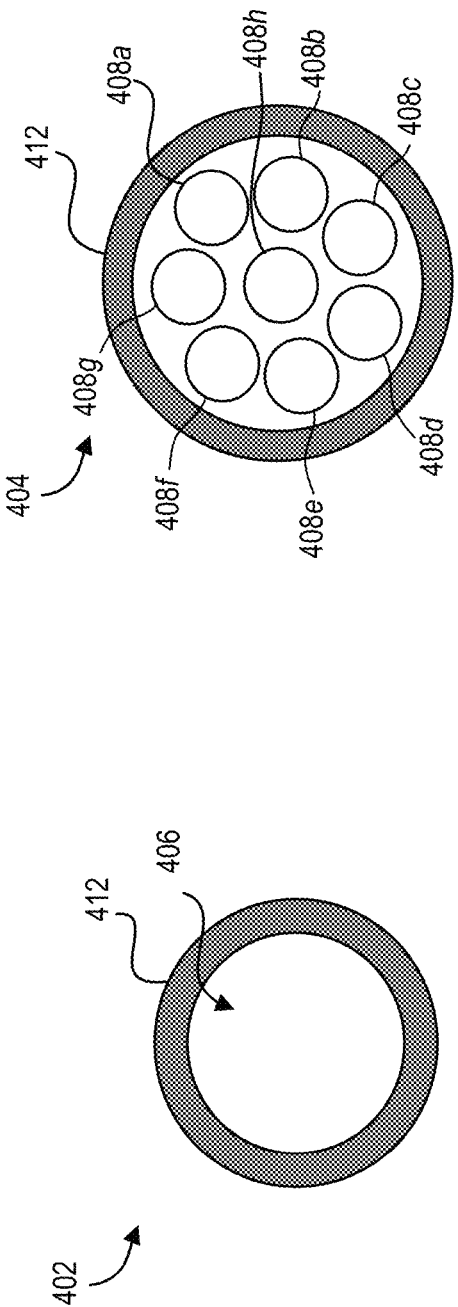
FIG. 4C
FIG. 4B

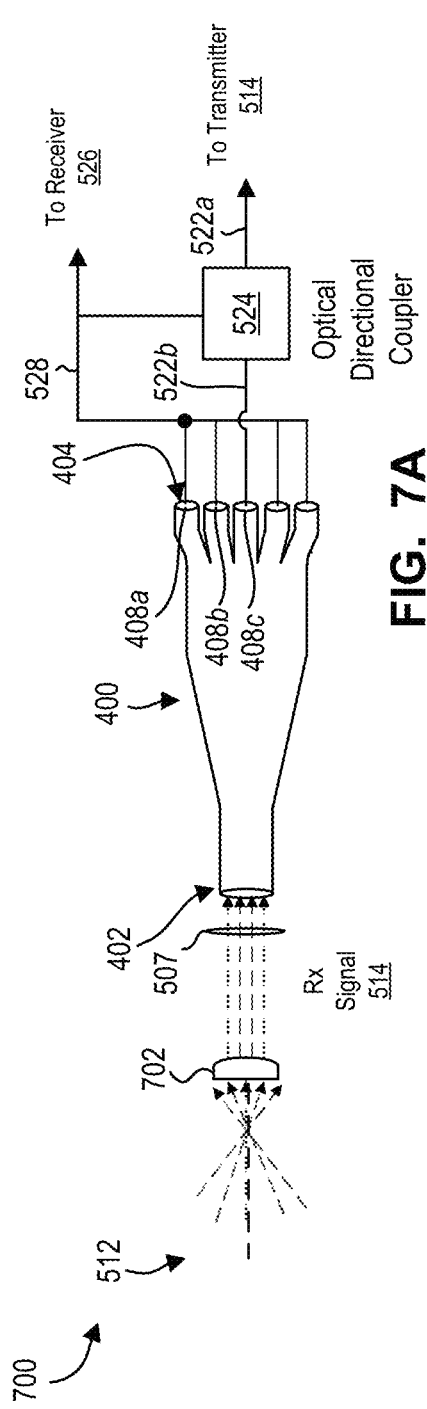
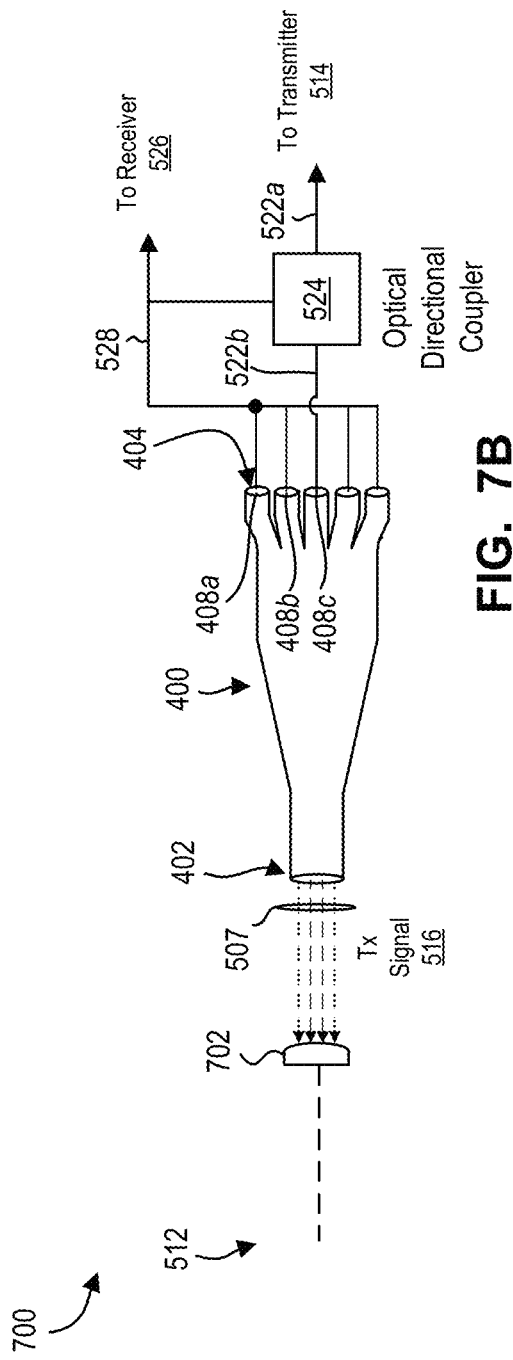

OPTICAL COMMUNICATION SYSTEM USING A PHOTONIC LANTERN

STATEMENT REGARDING FEDERALLY SPONSORED RESEARCH OR DEVELOPMENT

This invention was made with Government support under Contract No.: 19STDPG38 awarded by the Canadian Space Agency. The Government has certain rights in the invention

FIELD

Various embodiments are described herein that relate to optical communication systems, and in particular, to an optical communication system using a photonic lantern.

INTRODUCTION

The following is not an admission that anything discussed below is part of the prior art or part of the common general knowledge of a person skilled in the art.

Free space optical (FSO) communication links can be established between various optical communication terminals. For example, FSO links can occur between one or more satellites (i.e., inter-satellite FSO links), between satellites and ground-terminals, as well as between different ground-terminals.

SUMMARY OF VARIOUS EMBODIMENTS

The following introduction is provided to introduce the reader to the more detailed discussion to follow. The introduction is not intended to limit to define any claim or as yet unclaimed invention. One or more inventions may reside in any combination or sub-combination of elements or process steps disclosed in any part of this document including its claims and figures.

In accordance with a broad aspect of the teachings herein, there is provided an optical system comprising: an optical transmitting unit coupled to a signal transmitting path; an optical receiving unit coupled to a signal receiving path; a photonic lantern, the photonic lantern extending between a first open end and a second open end, the first open end comprising an opening to a single multi-mode fiber, and the second open end comprising a plurality of single mode fibers that are adiabatically coupled to the multi-mode fiber, the plurality of single-mode fibers include a single-mode fiber adapted to carry a fundamental optical mode and the remaining single-mode fibers adapted to carry higher-order optical modes, wherein the single-mode fiber adapted to carry the fundamental mode is coupled to the signal transmitting path, the remaining single-mode fibers are coupled to the signal receiving path, and the first end is coupled to an external optical signal path.

In at least one embodiment, the optical system further comprises a collimator lens located between the external optical signal path and the first end of the photonic lantern.

In at least one embodiment, the signal receiving path comprises a first receiving path portion and a second receiving path portion, the first receiving path portion comprising a plurality of mode-specific paths that are coupled to each single-mode fiber that receives the higher-order optical modes.

In at least one embodiment, the plurality of mode-specific receiving paths comprise optical links that are passively spliced together to form the second receiving path portion, the second receiving path portion also comprising an optical link.

In at least one embodiment, the optical system is adapted to receive an optical signal through the multi-mode fiber, the optical signal being received off-axis wherein the received optical signal travels in an inward direction through the photonic lantern and exists from one or more of the single-mode fibers at the second end adapted to carry the higher-order optical modes.

In at least one embodiment, optical system further comprises an optical directional coupler located along the signal transmitting path, between the transmitting unit and the opening to the single-mode fiber at the second end adapted to carry the fundamental mode.

In at least one embodiment, a first transmission path portion extends between the transmitting unit and the optical directional coupler, and a second transmission path portion extends between the optical directional coupler and the opening of the single-mode fiber at the second end adapted to carry the fundamental mode.

In at least one embodiment, the optical system is adapted to receive optical signals through the first end of the photonic lantern, the optical signals being received on-axis, wherein the received optical signal travels in an inward direction through the photonic lantern and exits the second end of the photonic lantern through the single-mode fiber adapted to carry the fundamental mode, and the optical directional coupler is configured to route the received optical signal onto the signal receiving path.

In at least one embodiment, the optical directional coupler is an optical circulator, the optical circulator comprising: a first port coupled to the optical transmitter via the first transmission path portion; a second port coupled, via the second transmission path portion, to the opening of the single-mode fiber adapted to carry the fundamental mode at the second end of the photonic lantern; and a third port coupled to the receiving unit via the optical receiving path, and wherein optical signals received in the first port are directed to exit the second port, and optical signals received in the second port are directed to exit the third port.

In at least one embodiment, the optical directional coupler comprises a wave division multiplexer (WDM), and wherein, the WDM is configured to receive transmitted optical signals having a first range of wavelengths and travelling in an outward direction along the first transmission path portion, and the WDM is configured pass the transmitted optical signals to the second transmission path portion, and the WDM is configured to receive received optical signals having a second range of wavelengths and travelling in an inward direction along the second transmission path portion, and the WDM is configured to pass the optical signals to the signal receiving path, and the second range of wavelengths being different from the first range of wavelengths.

In accordance with another broad aspect of the teachings herein, there is provided an optical system comprising: an optical transmitting unit coupled to a signal transmitting path; an optical receiving unit coupled to a signal receiving path; a modified photonic lantern, the modified photonic lantern extending between a first open end and a second open end, the first open end comprising a single multi-mode fiber and a central-single mode fiber, the multi-mode fiber surrounding the central single-mode fiber, and the second end comprising a plurality of single mode fibers that are adiabatically coupled to the multi-mode fiber, each single-mode fiber adapted to carry a higher order optical mode, the second end further comprising the central single-mode fiber, wherein the central single-mode fiber extends between the first open end and the second open end and is adapted to carry a fundamental optical mode, wherein, the central single-mode fiber is coupled, at the second end, to the signal transmitting path, and the plurality of single-mode fibers are coupled, at the second end, to the signal receiving path, and the first end of the photonic lantern is coupled to an external optical signal path.

In at least one embodiment, the optical receiving path comprises a first receiving path portion and a second receiving path portion, the first receiving path portion comprising a plurality of mode-specific paths that are coupled to each single-mode fiber.

In at least one embodiment, the plurality of mode-specific receiving paths comprise optical links that are passively spliced together to form the second receiving path portion, the second receiving path portion also comprising an optical link.

In at least one embodiment, the optical system is adapted to receive an optical signal through the multi-mode fiber, the optical signal being received off-axis wherein the received optical signal travels in an inward direction through the modified photonic lantern and exists from one or more of the single-mode fibers at the second end of the modified photonic lantern.

In at least one embodiment, the optical system further comprises an optical directional coupler located along the signal transmitting path, between the transmitting unit and the opening to the central single-mode fiber at the second end of the modified photonic lantern.

In at least one embodiment, a first transmission path portion extends between the transmitting unit and the optical directional coupler, and a second transmission path portion extends between the optical directional coupler and the opening of the central single-mode fiber at the second end of the photonic lantern.

In at least one embodiment, the optical system is adapted to receive optical signals through the opening of the central fiber at the first end of the modified photonic lantern, the optical signals being received on-axis, wherein the received optical signal travels in an inward direction through the modified photonic lantern and exits the opening of the central fiber at the second end of the photonic lantern, and the optical directional coupler is configured to route the received optical signal onto the signal receiving path.

In at least one embodiment, the optical directional coupler is an optical circulator, the optical circulator comprising: a first port coupled to the optical transmitter via the first transmission path portion; a second port coupled, via the second transmission path portion, to the opening of the central single-mode fiber at the second end of the photonic lantern; and a third port coupled to the receiving unit via the optical receiving path, and wherein optical signals received in the first port are directed to exit the second port, and optical signals received in the second port are directed to exit the third port.

In at least one embodiment, the optical directional coupler comprises a wave division multiplexer (WDM), and wherein, the WDM is configured to receive transmitted optical signals having a first range of wavelengths and travelling in an outward direction along the first transmission path portion, and the WDM is configured pass the transmitted optical signals to the second transmission path portion, and the WDM is configured to receive received optical signals having a second range of wavelengths and travelling in an inward direction along the second transmission path portion, and the WDM is configured to pass the optical signals to the signal receiving path, and the second range of wavelengths being different from the first range of wavelengths.

In at least one embodiment, the optical system further comprises a fine pointing assembly interposed between the first end of the modified optical lantern and the external optical signal path.

Other features and advantages of the present application will become apparent from the following detailed description taken together with the accompanying drawings. It should be understood, however, that the detailed description of the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiments, and which are now described. The drawings are not intended to limit the scope of the teachings described herein.

FIG. 2 shows a simplified block diagram of an example FSO communication link, in accordance with some embodiments;

FIG. 3 shows an example embodiment of a conventional design for an optical communication system;

FIG. 4A shows an example photonic lantern;

FIG. 4B shows a view of an example first end of an example photonic lantern;

FIG. 4C shows a view of an example second end of an example photonic lantern;

FIG. 7A shows an example embodiment of an optical communication system using a standard photonic lantern and illustrates an example case where an optical signal is being received; and FIG. 7B shows an example embodiment of an optical communication system using a standard photonic lantern and illustrates an example case where an optical signal is being transmitted.

Further aspects and features of the example embodiments described herein will appear from the following description taken together with the accompanying drawings.

DETAILED DESCRIPTION OF THE EMBODIMENTS

Figure 1:
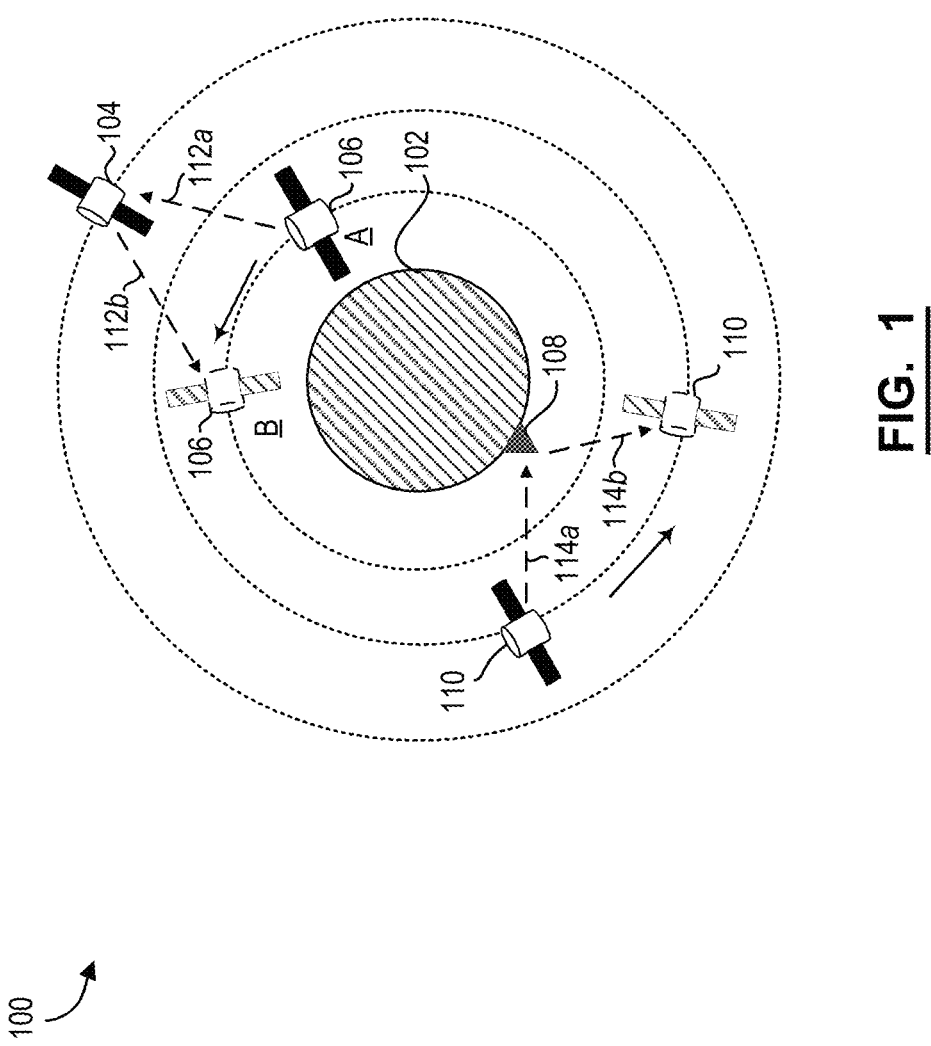
FIG. 1 shows an example environment for operating one or more free space optical (FSO) communication systems.

Reference is now made to FIG. 1, which shows an example environment 100 for operating free space optical (FSO) communication systems, in accordance with the teachings provided herein.

FSO communication systems are often located within communication terminals installed on satellites 104, 106 orbiting a ground (e.g., earth) 102 reference, as well as on airborne vehicles (i.e., aircrafts) and various ground-based terminals 108 (e.g., mobile or stationary). The communications systems are adapted to receive and/or transmit optical signals across free space mediums, including air mediums and/or vacuums (i.e., space). Each FSO system may include a transmitter to transmit outgoing optical signals and/or receivers to receive incoming optical signals. To this end, FSO communication links can be established between neighboring optical communication terminals to allow for exchange of data. For example, FSO links can be established between two or more satellites (i.e., inter-satellite FSO links 112a, 112b), between satellites and ground-terminals (i.e., FSO links 114a, 114b), as well as between various ground-terminals. Each FSO link can include downlinks (112a, 114a) as well as uplinks (112b, 114b).

Reference is now briefly made to FIG. 2, which shows a simplified block diagram of an example arrangement 200 for free space optical (FSO) communication, according to some embodiments.

As shown, an FSO link 206 may be established between at least two optical communication terminals 202, 204, i.e., terminals installed on satellites, aircrafts or on ground. The FSO link 206 can allow data to be exchanged between these terminals 202, 204 over a free space medium 208. In some cases, a communication terminal may only transmit optical signals, receive optical signals, or otherwise both transmit and receive optical signals (i.e., a transceiver terminal).

Reference is now made to FIG. 3, which shows an example FSO communication system 300 that may be located within a communication terminal, i.e., terminals 202, 204. The system 300 is an example of a conventional design for an optical communication system which allows for both transmission and reception of optical signals.

As shown, the FSO communication system 300 may include an optical signal transmitting pathway 302, an optical signal receiving pathway 304, and an external pathway 306. Interposed between the pathways 302, 304, 306 is a beam splitter 308. In the illustrated example, the beam splitter 308 is a dichroic mirror that splits the transmitting (Tx) and receiving (Rx) pathways along a central wavelength. For example, the dichroic beam splitter can pass outgoing optical signals having a first range of wavelengths, while reflecting incoming optical signals having a second range of wavelengths. In other cases, rather than being a dichroic mirror, the beam splitter 308 can comprise a polarizing beam splitter which separates optical signals based on their polarization. In still other cases, aperture splitting or mode splitting methods can also be used to separate the transmitting pathway 302 from the receiving pathway 304.

Transmitting pathway 302 may include a first fiber optic link or cable 310 for carrying transmitted optical signals 312, i.e., generated by an upstream transmitter, such as a laser light source. The fiber optic cable 310 carries the optical signal 312, and transmits the optical signal 312, via an internal aperture 314, towards the beam splitter 308 (i.e., from an open end of the optical fiber 310). In this example, the transmitted optical signal 312 is within the first range of wavelengths that passes directly through the dichroic beam splitter 308. The transmitted signal 312 continues onwards from the beam splitter 308 to the external pathway 306. External pathway 306 includes, for example, an external optical assembly 320, which comprises various mirrors, lenses etc. that magnify the outgoing signal, as well as direct the outgoing signal along a particular direction, i.e., via a coarse pointing assembly. The transmitted signal may then continue further onwards to other external communication terminals.

In the reverse case, an incoming optical signal, i.e., received from another external communication terminal, is received along the external pathway 306 via the external optical assembly 320. From the external optical assembly 320, the signal travels towards the beam splitter 308. The received signal 322 may be within a second range of wavelengths that is reflected by the beam splitter 308 towards the receiving pathway 304, and away from the transmission pathway 302. The received signal 322 travels through the receiving pathway 322 and, via an internal aperture 324, is received into a second fiber optic cable or link 326. The fiber optic cable 326 carries the received signal towards various receiving modules (i.e., modules for signal processing and demodulation, etc.)

As illustrated, each internal aperture 314, 324 may also include a corresponding fine pointing optical assembly 316, 328, as well as an actuator 318, 330 for controlling the respective fine pointing assembly. The fine pointing assemblies 316, 328 couple to the respective fiber optic link 310, 326 and either, (i) receive outgoing optical signals therefrom (i.e., assembly 316), or (ii) transmit incoming optical signals thereto (i.e., assembly 328). The fine pointing assemblies 316, 328 may comprises, for example, fast steering mirrors, and the actuators 318, 330 may comprises motors that rotate the fast steering mirrors. In some cases, only one of the fine pointing assemblies 316, 328 and corresponding actuators 318, 330 may be provided in the system. In some embodiments, a fine point assembly 332 (and corresponding actuator 334) may also be interposed between the beam splitter 308 and the external optical assembly 320.

The fine pointing assemblies 316, 328 may be adapted to provide fine beam steering of the corresponding optical signal. For example, this may involve jitter stabilization to maintain accurate directional beam steering notwithstanding vibrational forces. The fine pointing assemblies 316, 318 may also used for point ahead or point behind offset corrections. Point ahead and behind offset corrections compensate for non-negligible time-of-flight considerations when the FSO system 300 communicates with an external terminal having a high relative velocity (see e.g., satellites 104, 106 in FIG. 1). For example, during transmission of optical signals, as between the time the optical signal is transmitted by the FSO system 300, and the time the optical signal is received at an external terminal—the receiving terminal may have shifted its position owing to its high relative velocity (see e.g., satellite 106 in FIG. 1 shifting positions from position "A" to "B"). Accordingly, the fine pointing assembly 316 corrects the outgoing direction of the outgoing signal to accommodate for this positional shift. In the reverse case, when an optical signal is received from an external terminal, the fine pointing assembly 328 can effect small corrective deflections to the incoming signals so as to properly route the received signal into the optical link 326.

To this end, a number of disadvantages have been appreciated in the conventional design of FSO communication systems as shown by way of example in FIG. 3. One significant disadvantage is that the conventional design requires separating the transmitting and receiving channels (i.e., transmitting channel 302 and receiving channel 304). Each separate channel includes separate fiber coupling links 310, 326, as well as separate optical systems for each link (i.e., separate fine pointing assemblies 316, 328). Accordingly, to realize the conventional design, at least twice the system components (i.e., fine pointing assemblies and fiber optic links) and control systems (i.e., for controlling actuators 318, 330) are required to accommodate each separate channel. This, in turn, increases the mass and power consumption of the communication system. In many cases, free space optic (FSO) applications (i.e., satellites) require low mass and low power consumption for effective operation.

A further appreciated disadvantage is that the transmit and receive signals must have different wavelengths, or otherwise, different polarizations. This is to enable the beam splitter 308 to effectively separate between the transmit and receive channels. As such, techniques such as wavelength division multiplexing (WDM)—which allow for increased information transfer in the transmitted or received optical signals—may not operate well with the conventional system design.

In view of the foregoing, there is a desire for an optical communication system that can overcome at least some of the aforementioned disadvantages.

In accordance with at least some embodiments provided herein, there is provided an optical communication system that incorporates transmission and receiving channels (or transmission and receiving pathways) into a shared, or common fiber optic assembly. The optical communication system is realized through the use of nascent photonic lantern technology. Embodiments of the provided optical communication system may overcome at least some of the aforementioned disadvantages of conventional FSO communication systems.

Reference is now made to FIGS. 4A-4C, which show an example photonic lantern 400. The photonic lantern 400 is an example of a photonic lantern that may be incorporated into an optical communication system in accordance with the teachings provided herein.

In general, photonic lanterns operate by adiabatically merging several single-mode fiber optic cores into a single multi-mode optic fiber core, or vice versa. Various optical lantern constructions and architectures will be known to those skilled in the art, and include photonic lanterns that use, for example, aperiodic single-mode fiber Bragg gratings (see also e.g., T. A. Birks, I. Gris-Sánchez, S. Yerolatsitis, S. G. Leon-Saval, and R. R. Thomson, "The photonic lantern," Adv. Opt. Photon. 7, 107-167 (2015), which provides a review of known photonic lantern designs).

As best shown in FIG. 4A, the conventional photonic lantern extends between a first end 402 and a distal opposed second end 404. The first end 402 includes an opening into a single multi-mode optical fiber 406 (FIG. 4B), while the second end 404 includes a plurality of openings corresponding to a plurality of single-mode optical fibers (see e.g., 408a-408h in FIG. 4C). A mid-portion 412 extends between the first end 402 and second end 404 and adiabatically merges the single multi-mode fiber 406 to the plurality of single-mode fibers 408. More particularly, the mid-portion 412 maps various free space optical modes (e.g., gaussian, Hermite-gaussian and Laguerre-gaussian modes) entering the multi-mode fiber at the first end 402 into individualized singularized modes corresponding to each single-mode fibers 408. At least one of the single-mode fibers carries a fundamental optical mode from the multi-mode core (e.g., $HE_{11}$ or $LP_{01}$ modes, as known in the art), while the remaining single-mode fibers carry other higher order optical modes. In some cases, the single-mode fiber, carrying the fundamental mode, may be located at the radial center of the second end 404 of the lantern (e.g., 408h in FIG. 4C).

It has been appreciated herein that photonic lanterns may have a unique and novel application in designing FSO communication systems.

Figure 5A:
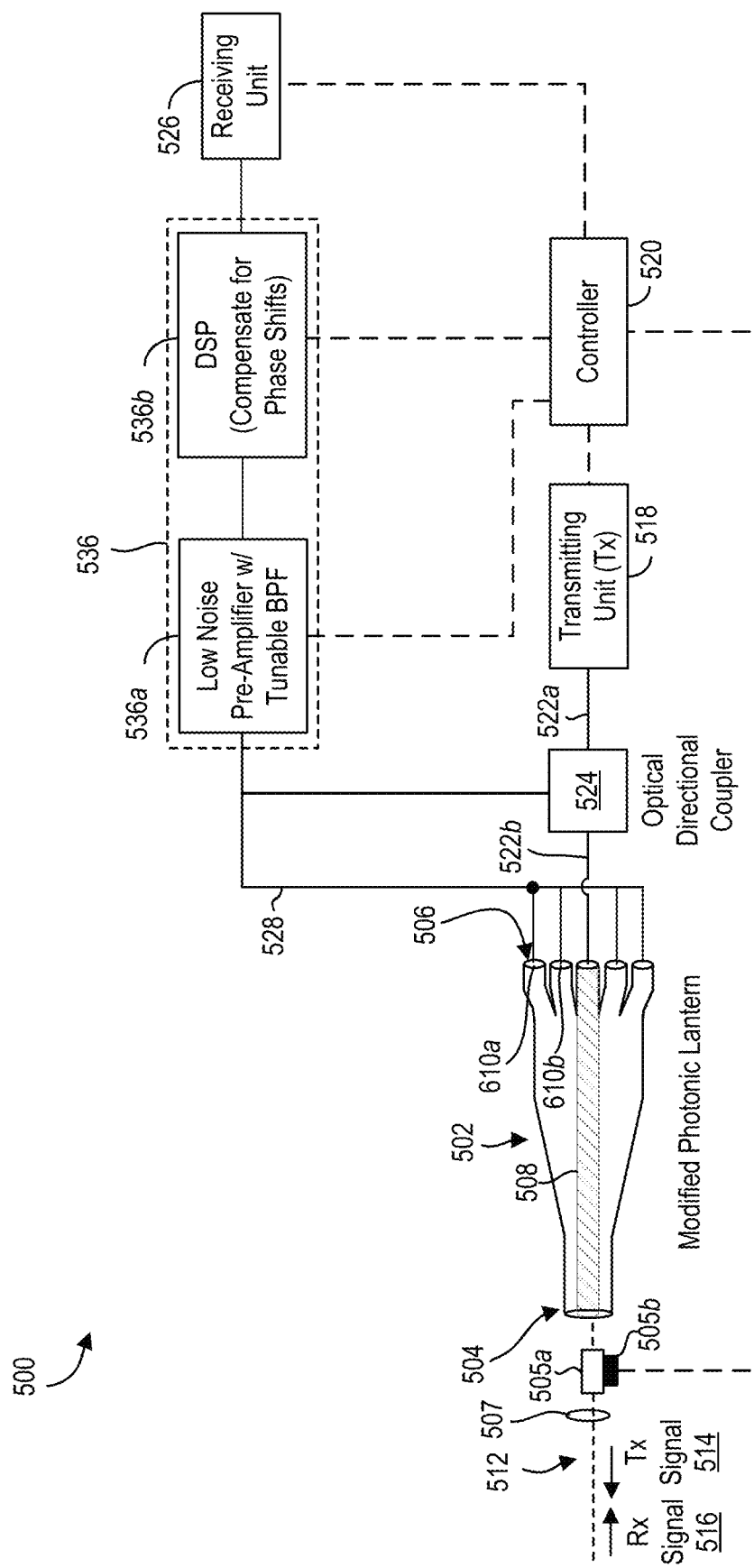
FIG. 5A shows an example embodiment of an optical communication system using an example modified photonic lantern.

Reference is now made to FIG. 5A, which shows an example embodiment of an FSO communication system 500 which incorporates a modified photonic lantern, according to at least one embodiment.

As shown, the system 500 includes the modified photonic lantern 502, which extends between a first photonic lantern end 504 and a second photonic lantern end 506. The modified photonic lantern 502 is generally analogous to the photonic lantern 400 of FIG. 4A, with the exception that the lantern 502 has been modified to include a central single-mode fiber 508 extending between the first and second ends 504, 506. The central single-mode fiber 508 carries a fundamental optical mode through the photonic lantern and is a separate optical fiber from the remaining photonic lantern.

Figure 6B:
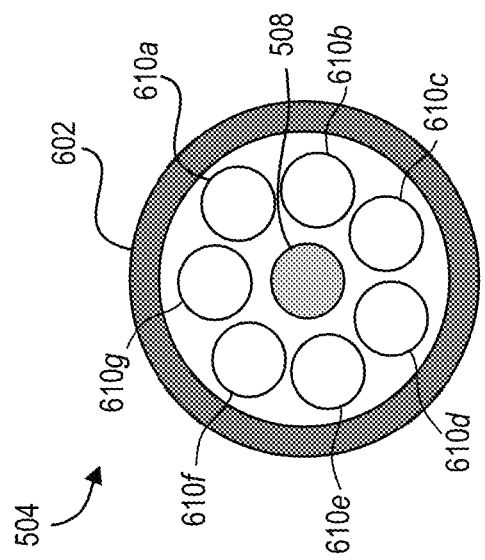
FIG. 6B shows a view of an example second end of an example modified photonic lantern.
Figure 6A:
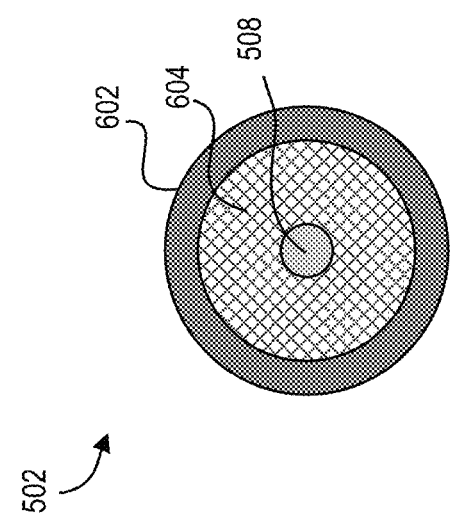
FIG. 6A shows a view of an example first end of an example modified photonic lantern.

To better clarify the modification to the photonic lantern 502, FIG. 6A shows a view of the first end 502 of the modified photonic lantern 502. As illustrated, the first end 502 may include the outer cladding 602, as well as an opening for a single multi-mode fiber core 604. The first end 502 also includes an opening into the central single-mode fiber 508 which is positioned (i.e., nested) in the radial center of the circular multi-mode fiber core. FIG. 6B shows a view of the second end 504 of the modified photonic lantern 502. The second end 504 includes openings for a plurality of single-mode fibers 610a-610g, which are adiabatically coupled to the multi-mode fiber 604 at the first end 502. The second end 504 also includes an opening to the central single-mode fiber 508. In this embodiment, at the second end 502, the central single-mode fiber 508 may replace the single-mode fiber that ordinarily carries the fundamental mode in the conventional lantern (i.e., 408h in FIG. 4C). That is, the single-mode fiber, normally carrying the fundamental mode, may be removed to accommodate the central single-mode fiber 508 that is extending between the first end 502 and the second end 506. The modified photonic lantern 502 therefore comprises the central single mode-fiber 508 surrounded by a structure corresponding to an otherwise conventional photonic lantern structure but with the fundamental single-mode fiber being removed to accommodate central fiber 508. In some embodiments, the first end 502 may have a multi-mode core that can carry 20 to 25 different optical modes, and the second end 504 may include 20 to 25 single-mode fibers 610 that map to each mode. The operation of the modified photonic lantern 502 within the optical system 500 is clarified in greater detail herein.

Continuing with reference to FIG. 5A, the first end 504 of the photonic lantern 502 may be coupled to an external communication path 512. The external communication path 512 may be analogous to the external pathway 306 in FIG. 3 and may include, for example, an external optical assembly (not shown). The external optical assembly may be similar to the assembly 320 and may be used to communicate with other optical communication terminals (i.e., located on other satellites).

In some cases, a fine pointing assembly 505a and a corresponding actuator 505b may be interposed between the first end 504 of the lantern 502 and the external communication path 512. The fine pointing assembly 505a may receive or transmit optical signals via an internal aperture 507. The actuator 505b may be controlled, for example, by a controller 520.

Figure 5B:
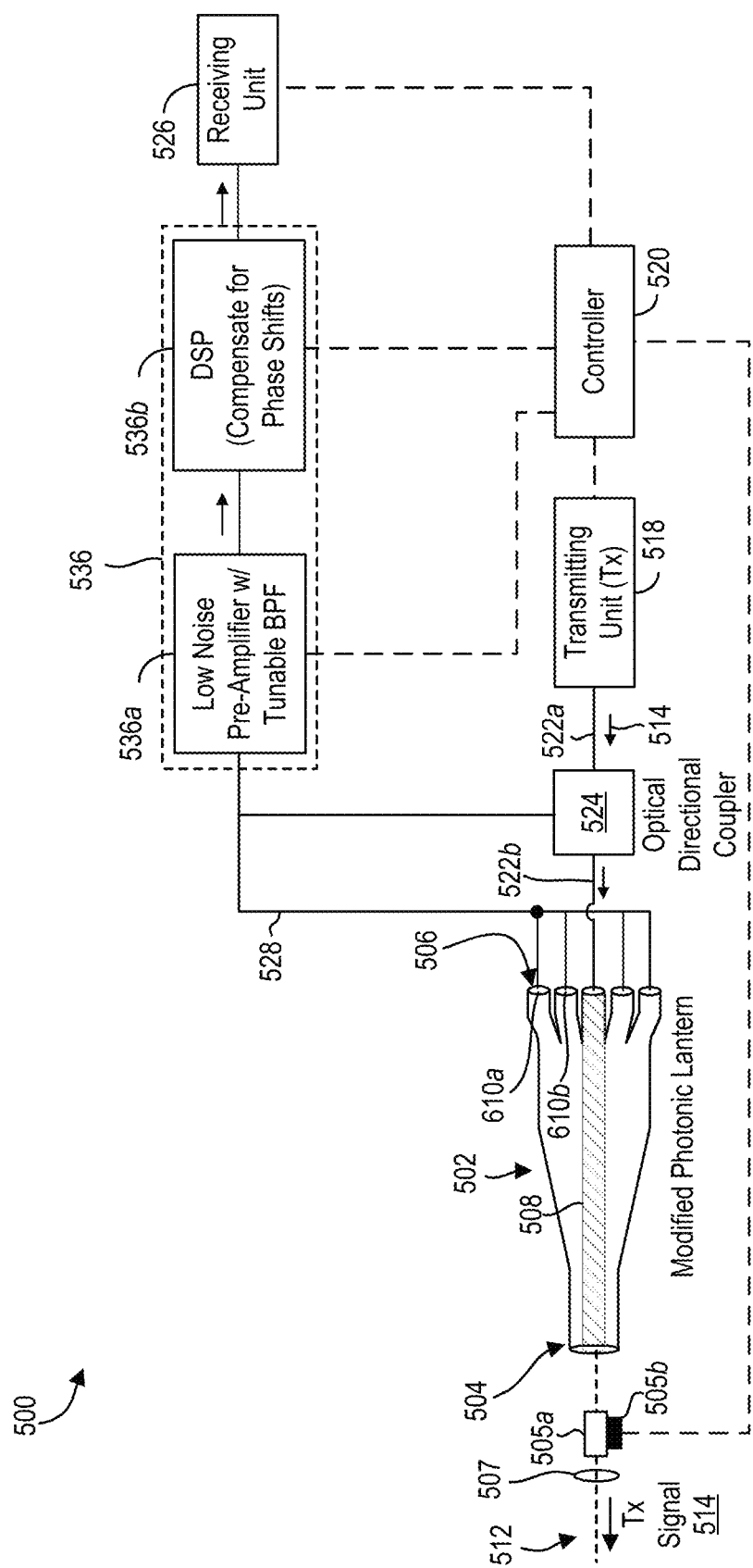
FIG. 5B shows the optical communication system of FIG. 5A in an example case where an optical signal is transmitted.
Figure 5C:
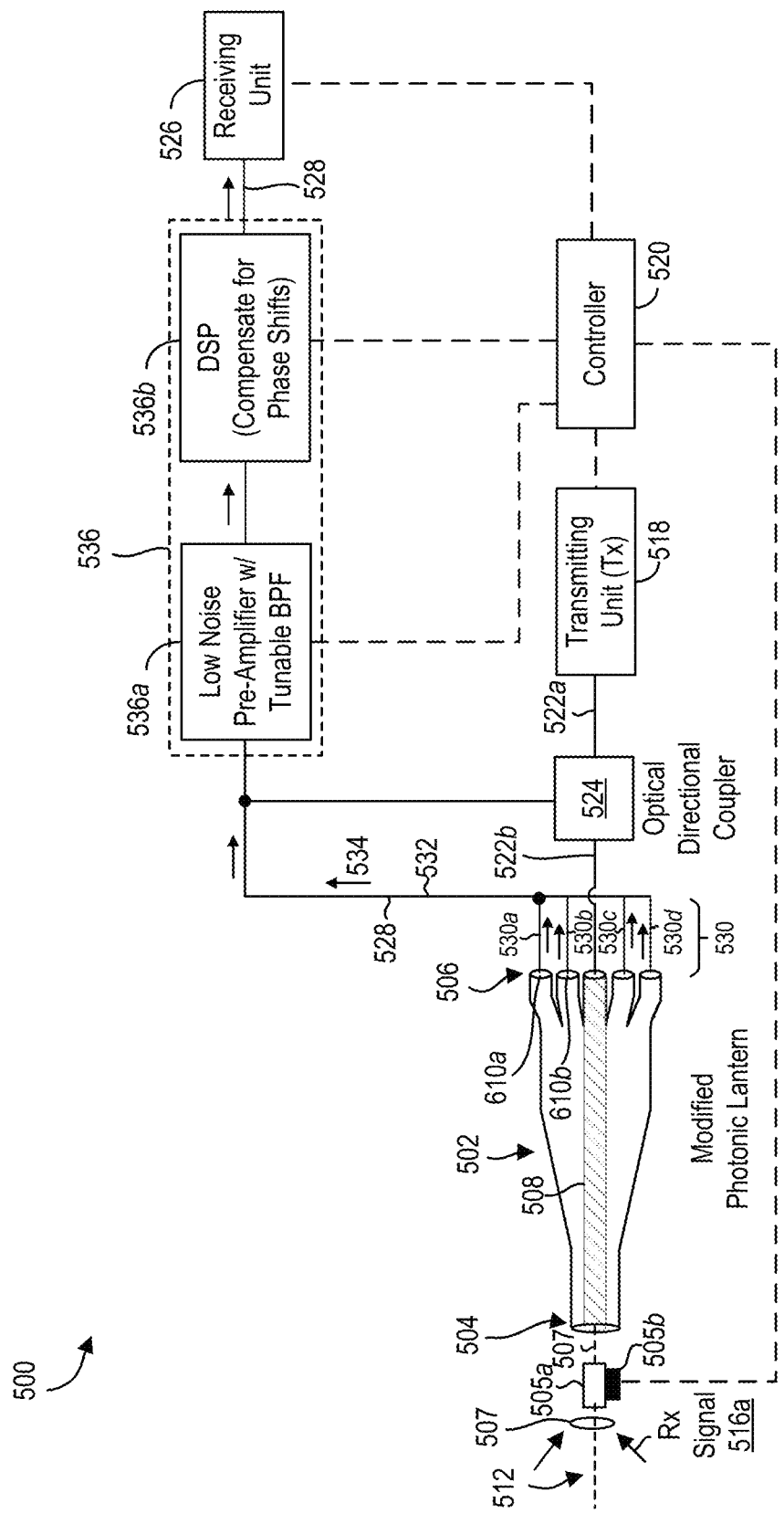
FIG. 5C shows the optical communication system of FIG. 5A in an example case where an optical signal is received off-axis.
Figure 5D:
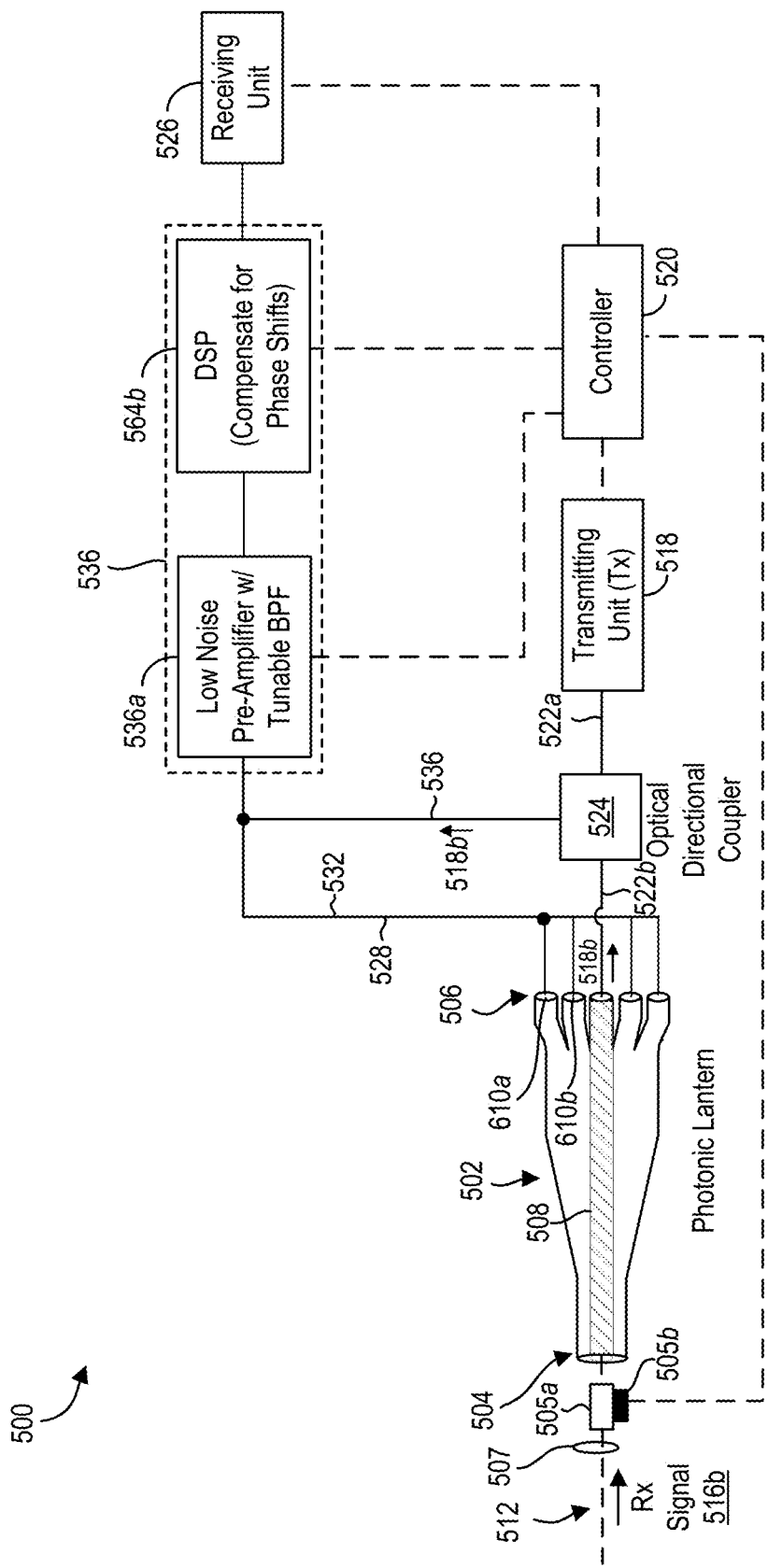
FIG. 5D shows the optical communication system of FIG. 5A in an example case where an optical signal is received on-axis.

The remainder of the optical system 500 is now explained in greater detail with reference to FIGS. 5B-5D. FIG. 5B illustrates an example case where optical signals are transmitted through the optical system 500, while FIGS. 5C and 5D illustrate example cases where optical signals are received through the optical system 500. For ease of description, not all elements of the optical system 500 as shown in FIG. 5A are reproduced in each of FIGS. 5B-5D, however it will be appreciated that these elements may still be included in the optical system.

Reference is now made to FIG. 5B, which shows an example case where the optical communication system 500 is used for transmitting optical signals.

As shown, the optical system 500 may include a transmitting unit 518. Transmitting unit 518 can convert outgoing signals from an alternate communication and/or processing format (e.g. Ethernet) into optical signals carrying data. The transmission unit 518 can be configured to modulate outgoing signals for transmission as an optical laser signal along a signal transmission path 522. For example, in some cases, the transmission unit 518 may include a laser light source. In some cases, the transmission unit 518 may include an external or integrated optical modulator such as an electro-absorption modulator (EAM) or a Lithium Niobate Mach Zehnder external modulator for example. The optical modulator may be operable to modulate the laser light source to generate an outgoing optical laser signal which is transmitted along the signal transmission path 522 to the photonic lantern 502. For example, the light source may be modulated such as by phase modulating the carrier optical signal (e.g., the laser beam) such that a modulated transmitted optical signal is generated which includes a sequence of multi-photon pulses with varying phase shifts, each phase shift corresponding to a unique data symbol (e.g., one more bits of information). In various cases, the amplitude of the carrier signal can also be varied, i.e., in addition to the phase, to encode a wider array of data. Examples of phase modulation schemes, and related variants, include n-PSK (phase-shift key) modulation, quadrature phase shift keying (QPSK), dual-polarization quadrature phase shift keying (DP-QPSK), offset phase shift keying (OPSK) modulation and n-QAM (quadrature amplitude modulation). In at least one embodiment, the transmitting unit 518 is coupled (i.e., electrically coupled) to the controller 520, which can include a processor with executable instructions that can control operation of the transmitting unit 518 (i.e., controlling time of transmission, data to be modulated into carrier signal, etc.).

Optical signals 514, generated by the transmitting unit 518, may travel in an outward direction along the signal transmission path 522. The signal transmission path 522 may extend between the transmitting unit 518 and the opening of the central optic fiber 508 at the second photonic lantern end 506. In at least one embodiment, the signal transmission path 522 may comprise an optical fiber cable or link. As used herein, the outward direction (i.e., outward signal direction) may refer to a direction that includes a signal travel path that includes signals travelling from the second end 506 of the lantern to the first end 504 of the lantern, while an inward direction (i.e., inward signal direction) may refer to a direction which includes a signal travel path extending from the first end 504 to the second end 506 of the lantern 502.

Travelling in the outward direction, the optical signal can travel through the signal transmission path 522 and onwards through the photonic lantern 502, via the central fiber 508, i.e., travelling from the second end 506 to the first end 504 of the modified photonic lantern 502. To this end, in order to travel within the central fiber 508, the optical signal generated by the transmitting unit 518, may be of a fundamental optical mode (i.e., the transmitting unit 518 may generate the carrier optical signal having the fundamental mode that is adapted to travel through the central fiber 508). Once the transmitted optical signal 514 exits the central fiber 508 at the first lantern end 504, the optical signal 512 may continue along the external signal path 512. In the illustrated embodiment, the first end 504 of the lantern 502 may be an open end. In at least some embodiments, the transmitted signal may exit the single-mode fiber 508 and may be directed by the fine pointing assembly 505a to accommodate for point ahead or point behind offsets.

In at least some embodiments, as illustrated, the signal transmission path 522 may be interposed by an optical directional coupler 524. The optical directional coupler 524 segments the signal transmission path 522 into a first transmission path portion 522a and a second transmission path portion 522b. The first portion 522a extends between the transmitting unit 518 and the optical directional coupler 524, while the second portion 522b extends between the optical directional coupler 524 and the opening of the central fiber 508 at the second lantern end 506. The operation of the optical directional coupler 524 is explained in greater detail herein with reference to FIGS. 5E and 5F.

Reference is now made to FIGS. 5C and 5D, which show example cases where the optical communication system 500 is used for receiving optical signals. FIG. 5C illustrates an example case where optical signals are received off-axis, while FIG. 5D illustrates an example case where optical signals are received on-axis.

Reference is initially made to FIG. 5C, which shows the optical communication system 500 receiving off-axis optical signals.

As shown, when received optical signals 516a are subject to a point ahead or point behind offsets, they may be received off-axis. That is, the received optical signal may be received by an offset angle corresponding to the point ahead or point behind angle as between the transmitting optical terminal and the receiving optical terminal. When a signal is received off-axis, it has been appreciated that the offset may appear (i.e., manifest) as an optical mode offset in the received optical signal. In other words, the angled reception of the optical beam may "distort" the optical beam at the receiving optical terminal such that the received optical signal is now characterized by one or more higher order optical modes that exclude the fundamental optical mode. In FIG. 5C, the reception of off-axis optical signals is expressed by arrows that are angled away from a central axis 507 that runs through a radial center (or otherwise, a center point) of the first end 504 of the photonic lantern 502 (i.e., corresponding to the location of the central fiber 508).

Accordingly, as the received optical signal comprises one or more higher optical modes the signal 516a may not enter the photonic lantern 502 through the central fiber 508 (i.e., corresponding to a fundamental mode) (i.e., the optical signal not carried by the central fiber 508). Rather, the received optical signal is received through (or otherwise, carried by) the surrounding multi-mode fiber core (604 in FIG. 6A). In this manner, the design of the modified photonic lantern 502 allows the received higher-order mode off-axis optical signal 516*a* to be diverted away from the transmitting unit 518, which is coupled to the central fiber 508. The modified photonic lantern 502 then adiabatically couples the received multi-mode optical signal (also referred to herein as a received higher-order mode optical signal), such that as the signal travels in the inward direction, and the various constituent signal modes exit the photonic lantern 506 at the second end 506, and via the one or more corresponding single-mode optical fibers (i.e., 610 in FIG. 6B). Here it will be understood that the each of the single-mode received optical signals, carried by each single-mode fiber 610, can map to one of the modes in the received multi-mode optical signal.

At the second end 506 of the lantern 502, the single-mode fibers 610 may each be coupled to a signal receiving path 528. The signal receiving path 528 may comprise, for example, one or more fiber optic links or cables that couple each of the single-mode fibers 610 to a receiving unit 526 (i.e., coupled to the openings of the single-mode fibers 610).

In the illustrated example, the optical receiving path 528 may include a first receiving path portion 530 and a second receiving path portion 532. The first portion 520 may include multiple paths, i.e., 530*a*-530*n* that connect to each respective opening of each single-mode fiber 610 (also referred to herein as mode-specific receiving paths 520, or simply mode-specific paths). Each mode-specific path 530 receives a corresponding single-mode optical signal from the respective single-mode fiber 610. The plurality of mode-specific paths 530 may then be combined into a single receiving path 532. In at least one embodiment, the mode-specific paths 520 may be passively spliced together to combine into the single path portion 532 adapted to carry a single optical signal mode. For example, this may occur by way of known splicing techniques, such as via mechanical splicing or fusion splicing of optical links or cables corresponding to each of the mode-specific paths 530. The received signa, that travels through the path portion 532, may be referred to herein as a combined received single-mode optical signal. The combined received single-mode optical signal may then travel through the path 532, and onwards toward the receiving unit 526.

Receiving unit 526 can convert incoming the combined received single-mode optical signal into an alternate communication and/or processing format (e.g. Ethernet). The receiving unit 526 can be configured to demodulate incoming optical laser signal(s) received through signal reception path 528. In at least one embodiment, the receiving unit 526 may be coupled to a controller 520, which can control the operation of the receiving unit 526. In some embodiments, the receiving unit 526 can include a heterodyne IQ (in-phase, and quadrature) demodulator photonic integrated circuit. The heterodyne IQ demodulator may include an amplified photodiode signal transducer and a local heterodyne laser source.

In some embodiments, the optical system 500 may include a signal processing unit 536. The signal processing unit 536 may be interposed along the signal reception path 528 (i.e., along the second reception path portion 532). The signal processing unit 536 can include one or more hardware sub-units for performing, for example, filtering, amplification, as well as for correcting for various time-varying and transmission-related errors in the received signal (i.e., to allow for proper decoding and/or demodulating of signal data).

In the illustrated example, the signal processing unit 536 can include a first sub-unit 536*a* for low noise pre-amplification and applying a tunable bandpass filter. In some embodiments, sub-units 536*a* may not include a tunable bandpass filter, which may be the case where the receiving unit 526 is a heterodyne receiver. The signal processing unit 536 may also include a second sub-unit 536*b* which performs digital signal processing (DSP) to compensate for phase shifts. In some cases, the DSP may comprise an electronic chip attached to the output of the optical receiving unit 526. The signal processing unit 536 may be implemented using any known method known in the art. In some embodiments, one or more components of the signal processing unit 536 may be coupled to the controller 520, such that the controller 520 can control operation and functioning of the unit 536.

In some embodiments, phase offsets between the receiving single-mode fibers 610 may be compensated either actively or passively to minimize destructive interference between captured modes (see e.g., techniques as discussed in A. Belmonte and J. Kahn, "Field Conjugation Adaptive Arrays in Free-Space Coherent Laser Communications," in IEEE/OSA Journal of Optical Communications and Networking, vol. 3, no. 11, pp. 830-838, November 2011, doi: 10.1364/JOCN.3.000830). It also been appreciated that, in some cases, wavefront tilts in the incoming beam due to off-axis receive angles are likely to couple asymmetrically, resulting in a majority of the optical amplitude being captured by a single lantern output, thus limiting destructive interference losses.

Reference is now made to FIG. 5D, which shows the optical communication system 500, and illustrates an example case where an on-axis signal is received.

In cases where an optical signal is not received with point ahead or point behind offsets, the optical signal 516*b* may be received on-axis. The on-axis signal is typically comprised of a single fundamental mode, and is therefore received back into the central fiber 508 via the first end 504 of the photonic lantern 502. It will be appreciated that the positioning of the central fiber 508 in the radial center of the first lantern end 504 is to facilitate reception of on-axis signals (e.g., the axis 507). The received optical signal 516*b* propagates in the inward direction through the central fiber 508 and exits the modified photonic lantern 502 at the second end 506.

To prevent the received signal 518*b* from interfering with transmitting unit 518, the optical directional coupler 524 can be positioned to re-route the received signal 518*b* away from the transmitting unit 518, and back onto the signal recipient path 528 (i.e., directly, or via an intermediate signal path portion 536 comprising, for example, a fiber optic link). Accordingly, the optical directional coupler 524 can accommodate the unique case where the signal is not received off-axis. The optical directional coupler 524 is now explained in greater detail herein with reference to FIG. 5E and FIG. 5F.

Figure 5E:
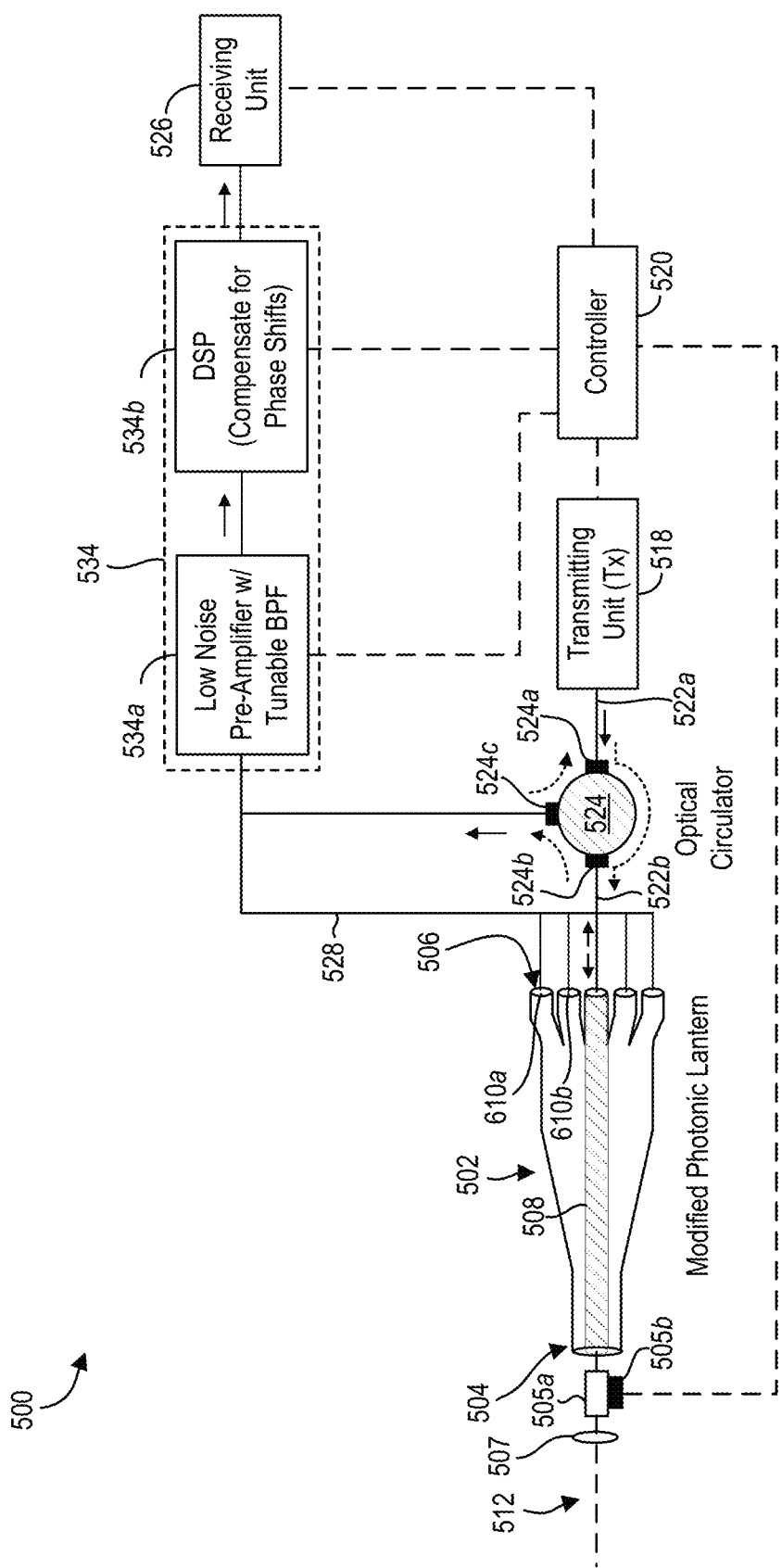
FIG. 5E shows the optical communication system of FIG. 5A, according to some embodiments.

FIG. 5E illustrates the optical system 500, and illustrates an example embodiment of the optical directional coupler 524. In this example, the optical directional coupler 524 comprises an optical circulator 524. As shown, the optical circulator 524 can include a number of ports 524*a*, 524*b*, 524*c*: (i) port 524*a* may be coupled to the transmitting unit 518 via the first signal transmission path portion 522*a*, (ii) port 524*b* may be coupled to the opening of the central single-mode fiber 508 at the second end of the lantern 502 via the second signal transmission path portion 522*b*, and (iii) port 524*c* may be coupled to the receiving unit 526 via the receiving path 528 (i.e., port 524*c* may couple to the receiving path 528 either directly, or via the intermediate path portion 536 which can be passively spliced into the receiving path 528).

Within the optical circulator 524, first port 524*a* may be internally coupled to the second port 524*b* such that transmitted signals, i.e., from the transmitting unit 518, are forwarded toward the central fiber 508 coupled to the second transmission path portion 522*b*. The second port 524*b* is further internally coupled to the third port 524*c* such that incoming on-axis received signals, i.e., from the central fiber (FIG. 5D), are routed to the signal receiving path 528, and away from the transmitting unit 528.

Figure 5F:
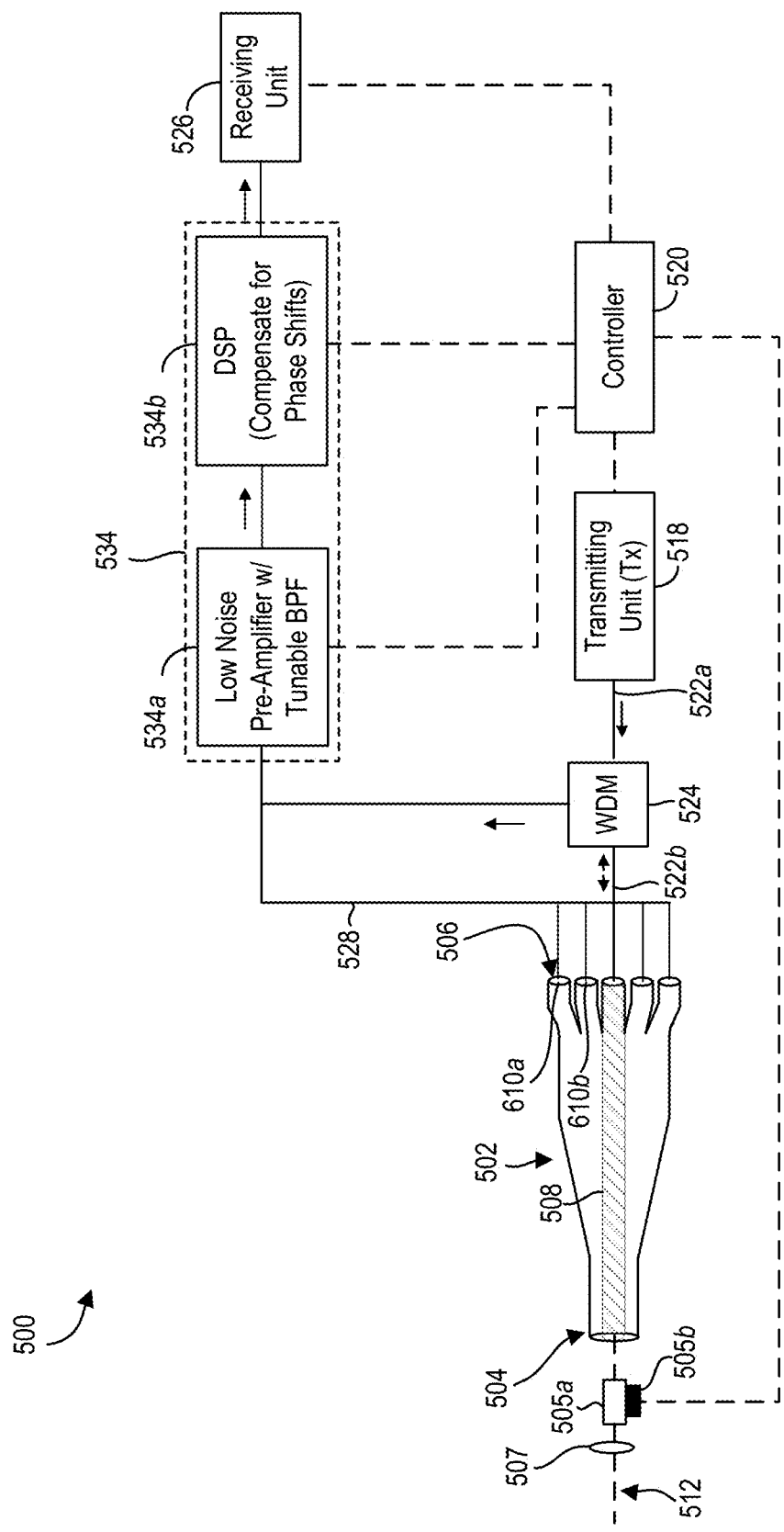
FIG. 5F shows the optical communication system of FIG. 5A, according to some other embodiments.

FIG. 5F illustrates another example embodiment of the optical system 500. In this embodiment, the optical directional coupler 524 comprises a wave division multiplexer (WDM). The WDM 524 is used to transmit (i.e., filter) signals emitted from the transmitting unit 518 at a first range of wavelengths, and to pass the signals from the first transmit path portion 522*a* to the second transmit path portion 522*b*, and towards the central fiber 508 (i.e., signals travelling in an outward direction). The WDM 524 can also be used to route received on-axis signals having a second wavelength range, along the signal receiving path 528, i.e., to pass these signals—travelling in the inward direction— from the second signal transmit path portion 522*b* towards the signal receiving path 528.

In will now be understood that the optical directional coupler is adapted to, (i) couple the second signal transmitting path portion 522*b* to the signal receiving path 532 in the case of received optical signals travelling in the inward direction, and further (ii) couple the first signal transmitting path portion 522*a* to the second signal transmitting path portion 522*b* in the case of transmitted signals travelling in the outward direction. Accordingly, the optical directional coupler is so-named for its function in coupling signals travelling in two opposite directions to two different signal paths. Further, it will be understood that the use of optical circulators and WDMs are only two non-limiting examples of devices or mechanisms that can act as optical directional couplers, and that the optical system 500 can include any other suitable device or mechanism that can similarly act as an optical directional coupler.

In view of the above, it will be appreciated that the use of the modified photonic lantern 502 in the FSO system 500 enables incorporating both the transmission and receiving channels into the same fiber optic assembly, i.e., comprising the modified photonic lantern. Accordingly, the transmit and receive channels can share, for example, a single fine steering assembly (i.e., 505 in FIG. 5A), thereby eliminating the dual controls for separate fine steering assemblies as shown in the conventional design in FIG. 3. This, in turn, can allow the optical communication terminal to have a simpler design with lower mass and power consumption.

It will be further appreciated that, owing to the large multi-mode core at the first end 504 of the modified photonic lantern 502, the lantern 502 is suited for communication terminals that receive over a large array of angles (i.e., owing to point ahead or point behind offsets), thereby allowing the FSO communication system 500 to have a large field of view. The multi-modes received at the first end 504 are then converted into a plurality of single-mode inputs, and via passive splicing, and are combined into one single-mode input. As explained above, the use of the optical directional coupler in association with a single central mode fiber that carries only a fundamental mode mitigates cases where an optical signal is received on-axis (FIG. 5D).

Reference is now made to FIGS. 7A and 7B, which shows an optical communication system 700, in accordance with some other embodiments. The system 700 is generally analogous to the system 500, with the exception that a conventional (i.e., non-modified) photonic lantern 400 is used. For ease of description, not all components of the optical communication system 700 are illustrated (i.e., the fine steering assembly 505, receiving unit 526, transmitting unit 518, controller 520, and signal processing module 536)—however, it will be understood that these components may be incorporated into the system 700 in an analogous manner as shown in system 500.

In the illustrated embodiment, the photonic lantern 400 is placed in aperture space such that optical signals from different directions are collimated (i.e., by a collimator 702) prior to entering the first end 402 of the photonic lantern 400. During reception of optical signals (FIG. 7A), the collimator 702 ensures that light from different directions fill the entire internal aperture 704, located at the first end 402 of the lantern 400. Received optical signals that are off-axis will include multiple higher-order optical modes and will exit the photonic lantern from the second end 404 from one or more of the single mode fibers 408 that carry the higher-optical modes (e.g., 408*a*-408*g* in FIG. 4C) (also referred to herein as higher-order mode fibers, or higher-order mode single-mode fibers). Received optical signals that are on-axis will include a fundamental mode that will propagate from the first end 402 to the second end 404, and exit the single mode fiber that carries the fundamental mode (i.e., single mode fiber 408*h* in FIG. 4C) (also referred to herein as a fundamental mode fiber, or fundamental mode single-mode fiber). In this example embodiment, the single mode fiber 408*c*, which carries the fundamental mode, is coupled to the receiving-transmission pathway portion 522*b*.

In the reverse case, transmitted optical signals travel through the transmission pathway 522, and into the single-mode fiber (i.e., single-mode fiber 408*h*) that is coupled to the transmission path 522 and which carries the fundamental mode. In this embodiment, as there is no central single-mode fiber as shown in the photonic lantern 502, the transmitted optical signal exits from the multi-mode fiber at first end 402 of the lantern 400. As a result, the transmitted optical signal emits across the full aperture 704, and is directed towards the collimator 702.

While not shown, the optical system 700 may also include other optical components and systems (i.e., other lenses, or a fine pointing assembly) rearward of the collimator 702 (i.e., in the outward direction), including the fine pointing assembly. For example, the collimator 702 may be interposed between the first end 402 of the photonic lantern 400 and a fine-pointing assembly 505*a* with an actuator 505*b* (not shown in FIG. 7).

It will now be appreciated that the embodiments shown in FIGS. 5 and 7 are joined by the common novel concept of using a photonic lantern as a common optic fiber link to receive and transmit signals, thereby precluding the need to use separate transmit and receive optical fiber pathways as between the transmitter/receiver and the external optical signal path (as well as fine pointing assembly) The embodiment of FIG. 5 modifies the photonic lantern to accommodate a single-mode fiber for the fundamental mode that extends between the two lantern ends, while the embodiment of FIG. 7 allows the use of a conventional lantern. In each case, the use of a photonic lantern is used, and positioned between an external signal path, a receiving signal path and a transmitting signal path.

Various apparatuses or processes have been described herein to provide an example of at least one embodiment of the claimed subject matter. No embodiment described limits any claimed subject matter and any claimed subject matter may cover processes, apparatuses, devices or systems that differ from those described. The claimed subject matter is not limited to apparatuses, devices, systems or processes having all of the features of any one apparatus, device, system or process described or to features common to multiple or all of the apparatuses, devices, systems or processes described. It is possible that an apparatus, device, system or process described is not an embodiment of any claimed subject matter. Any subject matter that is disclosed in an apparatus, device, system or process described that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. In addition, the description is not to be considered as limiting the scope of the example embodiments described herein.

It should also be noted that the terms "coupled" or "coupling" as used herein can have several different meanings depending in the context in which the term is used. For example, the term coupling can have a mechanical or electrical connotation. For example, as used herein, the terms "coupled" or "coupling" can indicate that two elements or devices can be directly connected to one another or connected to one another through one or more intermediate elements or devices via an electrical element, electrical signal or a mechanical element such as but not limited to, a wire or a cable, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed (e.g., ±5%, ±10% ±15%, etc.).

The various embodiments of the devices, systems and methods described herein may be implemented using a combination of hardware and software. These embodiments may be implemented in part using computer programs executing on programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, the computing device may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device.

In some embodiments, the communication interface may be a network communication interface, a USB connection or another suitable connection as is known by those skilled in the art. In other embodiments, the communication interface may be a software communication interface, such as those for inter-process communication (IPC). In still other embodiments, there may be a combination of communication interfaces implemented as hardware, software, and a combination thereof.

In at least some of the embodiments described herein, program code may be applied to input data to perform at least some of the functions described herein and to generate output information. The output information may be applied to one or more output devices, for display or for further processing.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object-oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein.

Furthermore, some of the programs associated with the system, processes and methods of the embodiments described herein are capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An optical system comprising:
   a) an optical transmitting unit coupled to a signal transmitting path;
   b) an optical receiving unit coupled to a signal receiving path;
   c) a photonic lantern, the photonic lantern extending between a first open end and a second open end, the first open end comprising an opening to a single multi-mode fiber, and the second open end comprising a plurality of single mode fibers that are adiabatically coupled to the multi-mode fiber, the plurality of single-mode fibers include a single-mode fiber adapted to carry a fundamental optical mode and the remaining single-mode fibers adapted to carry higher-order optical modes, wherein,
      the single-mode fiber adapted to carry the fundamental mode is coupled to the signal transmitting path,
      the remaining single-mode fibers are coupled to the signal receiving path,
      the first end is coupled to an external optical signal path; and
      the signal receiving path comprises a first receiving path portion and a second receiving path portion, the first receiving path portion comprising a plurality of mode-specific paths that are coupled to each single-mode fiber that receives the higher-order optical modes.

2. The optical system of claim 1, further comprising a collimator lens located between the external optical signal path and the first end of the photonic lantern.

3. The optical system of claim 1, wherein the plurality of mode-specific receiving paths comprise optical links that are passively spliced together to form the second receiving path portion, the second receiving path portion also comprising an optical link.

4. The optical system of claim 1, wherein the optical system further comprises an optical directional coupler located along the signal transmitting path, between the transmitting unit and the opening to the single-mode fiber at the second end adapted to carry the fundamental mode.

5. The optical system of claim 4, wherein a first transmission path portion extends between the transmitting unit and the optical directional coupler, and a second transmission path portion extends between the optical directional coupler and the opening of the single-mode fiber at the second end adapted to carry the fundamental mode.

6. The optical system of claim 5, wherein the optical directional coupler is an optical circulator, the optical circulator comprising:
   a first port coupled to the optical transmitter via the first transmission path portion;
   a second port coupled, via the second transmission path portion, to the opening of the single-mode fiber adapted to carry the fundamental mode at the second end of the photonic lantern; and
   a third port coupled to the receiving unit via the optical receiving path, and
   wherein optical signals received in the first port are directed to exit the second port, and optical signals received in the second port are directed to exit the third port.

7. The optical system of claim 5, wherein the optical directional coupler comprises a wave division multiplexer (WDM), and wherein,
   the WDM is configured to receive transmitted optical signals having a first range of wavelengths and travelling in an outward direction along the first transmission path portion, and the WDM is configured pass the transmitted optical signals to the second transmission path portion, and
   the WDM is configured to receive received optical signals having a second range of wavelengths and travelling in an inward direction along the second transmission path portion, and the WDM is configured to pass the optical signals to the signal receiving path, and
   the second range of wavelengths being different from the first range of wavelengths.

8. The optical system of claim 4, wherein the optical system is adapted to receive optical signals through the first end of the photonic lantern, the optical signals being received on-axis, wherein the received optical signal travels in an inward direction through the photonic lantern and exits the second end of the photonic lantern through the single-mode fiber adapted to carry the fundamental mode, and the optical directional coupler is configured to route the received optical signal onto the signal receiving path.

9. The optical system of claim 1, wherein the optical system is adapted to receive an optical signal through the multi-mode fiber, the optical signal being received off-axis wherein the received optical signal travels in an inward direction through the photonic lantern and exits from one or more of the single-mode fibers at the second end adapted to carry the higher-order optical modes.

10. An optical system comprising:
   a) an optical transmitting unit coupled to a signal transmitting path;
   b) an optical receiving unit coupled to a signal receiving path;
   c) a photonic lantern, the photonic lantern extending between a first open end and a second open end, the first open end comprising an opening to a single multi-mode fiber, and the second open end comprising a plurality of single mode fibers that are adiabatically coupled to the multi-mode fiber, the plurality of single-mode fibers include a first single-mode fiber and a plurality of remaining single-mode fibers,
   wherein,
      the first single-mode fiber is coupled to the signal transmitting path,
      the remaining single-mode fibers are coupled to the signal receiving path,
      the first end is coupled to an external optical signal path;
      the signal receiving path comprises a first receiving path portion and a second receiving path portion, the first receiving path portion comprising a plurality of fiber-specific paths that are coupled to each of the remaining single-mode fibers;
      the optical system is adapted to receive an optical signal from the external optical signal path through the opening to the multi-mode fiber, the optical signal being received off-axis wherein the received optical signal travels in an inward direction through the photonic lantern and exits from one or more of the remaining single-mode fibers at the second end; and the optical system is adapted to transmit an outgoing optical signal to the external optical signal path, wherein the outgoing optical signal is transmitted from the optical transmitting unit along the signal transmitting path to the first single-mode fiber and through the photonic lantern to the external optical signal path.

11. An optical system comprising:
a) an optical transmitting unit coupled to a signal transmitting path;
b) an optical receiving unit coupled to a signal receiving path;
c) a modified photonic lantern, the modified photonic lantern extending between a first open end and a second open end, the first open end comprising a single multi-mode fiber and a central-single mode fiber, the multi-mode fiber surrounding the central single-mode fiber, and the second end comprising a plurality of single mode fibers that are adiabatically coupled to the multi-mode fiber, each single-mode fiber adapted to carry a higher order optical mode, the second end further comprising the central single-mode fiber, wherein the central single-mode fiber extends between the first open end and the second open end and is adapted to carry a fundamental optical mode,
wherein,
the central single-mode fiber is coupled, at the second end, to the signal transmitting path, and
the plurality of single-mode fibers are coupled, at the second end, to the signal receiving path,
the first end of the photonic lantern is coupled to an external optical signal path; and
the optical receiving path comprises a first receiving path portion and a second receiving path portion, the first receiving path portion comprising a plurality of mode-specific paths that are coupled to each single-mode fiber.

12. The optical system of claim 11, wherein the plurality of mode-specific receiving paths comprise optical links that are passively spliced together to form the second receiving path portion, the second receiving path portion also comprising an optical link.

13. The optical system of claim 12, wherein the optical system is adapted to receive an optical signal through the multi-mode fiber, the optical signal being received off-axis wherein the received optical signal travels in an inward direction through the modified photonic lantern and exits from one or more of the single-mode fibers at the second end of the modified photonic lantern.

14. The optical system of claim 11, wherein the optical system further comprises an optical directional coupler located along the signal transmitting path, between the transmitting unit and the opening to the central single-mode fiber at the second end of the modified photonic lantern.

15. The optical system of claim 14, wherein a first transmission path portion extends between the transmitting unit and the optical directional coupler, and a second transmission path portion extends between the optical directional coupler and the opening of the central single-mode fiber at the second end of the photonic lantern.

16. The optical system of claim 15, wherein the optical directional coupler is an optical circulator, the optical circulator comprising:
a first port coupled to the optical transmitter via the first transmission path portion;
a second port coupled, via the second transmission path portion, to the opening of the central single-mode fiber at the second end of the photonic lantern; and
a third port coupled to the receiving unit via the optical receiving path, and
wherein optical signals received in the first port are directed to exit the second port, and optical signals received in the second port are directed to exit the third port.

17. The optical system of claim 15, wherein the optical directional coupler comprises a wave division multiplexer (WDM), and wherein,
the WDM is configured to receive transmitted optical signals having a first range of wavelengths and travelling in an outward direction along the first transmission path portion, and the WDM is configured pass the transmitted optical signals to the second transmission path portion, and
the WDM is configured to receive received optical signals having a second range of wavelengths and travelling in an inward direction along the second transmission path portion, and the WDM is configured to pass the optical signals to the signal receiving path, and
the second range of wavelengths being different from the first range of wavelengths.

18. The optical system of claim 14, wherein the optical system is adapted to receive optical signals through the opening of the central fiber at the first end of the modified photonic lantern, the optical signals being received on-axis, wherein the received optical signal travels in an inward direction through the modified photonic lantern and exits the opening of the central fiber at the second end of the photonic lantern, and the optical directional coupler is configured to route the received optical signal onto the signal receiving path.

19. The optical system of claim 11, further comprising a fine pointing assembly interposed between the first end of the modified optical lantern and the external optical signal path.

* * * * *